Oct. 20, 1931.  H. J. MURRAY  1,828,508
SYNCHRONIZER DEVICE
Filed April 25, 1928
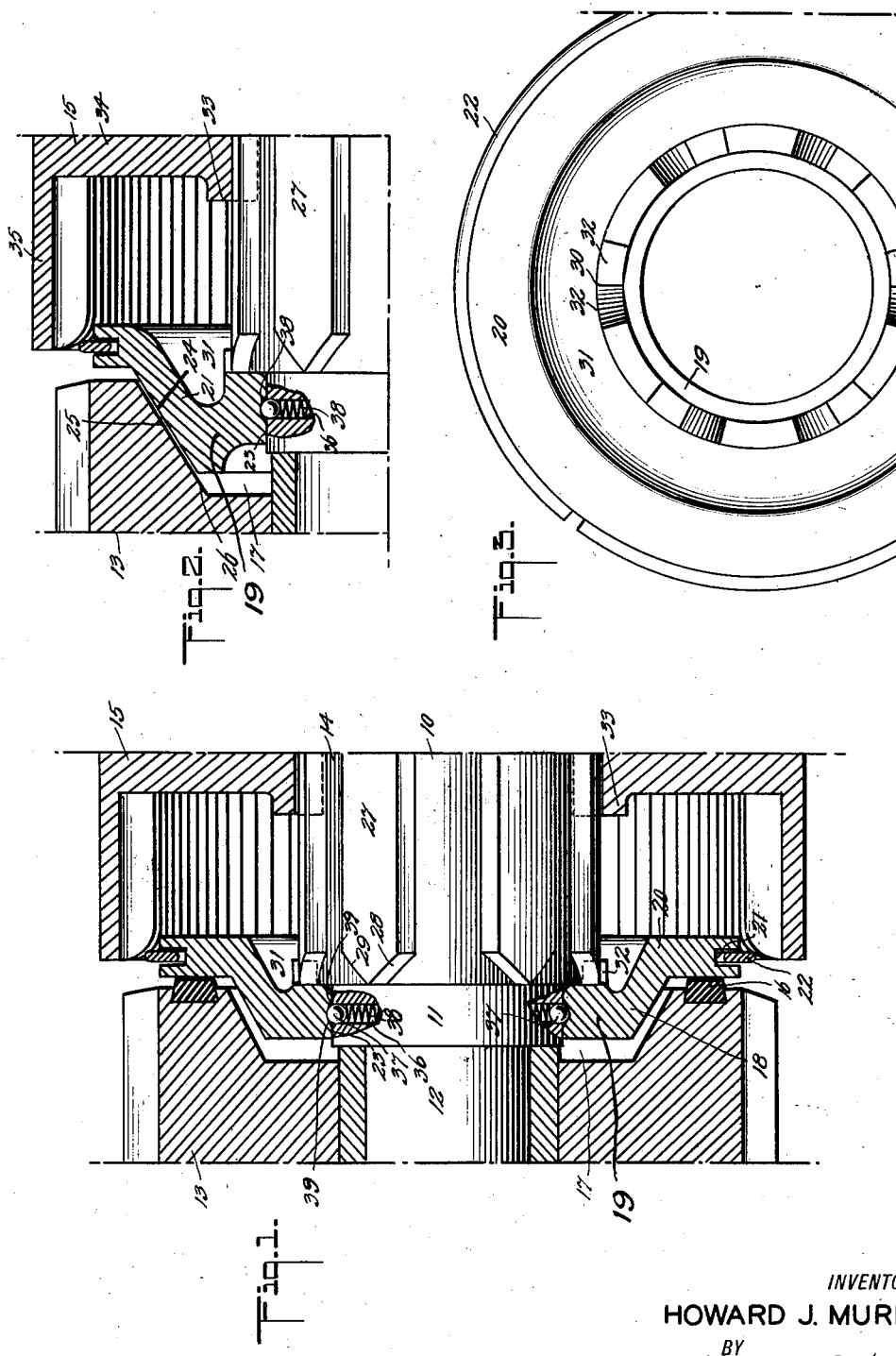
INVENTOR
HOWARD J. MURRAY
BY
*Warren S. Orton*
ATTORNEY Patented Oct. 20, 1931

1,828,508

UNITED STATES PATENT OFFICE

HOWARD J. MURRAY, OF BROOKLYN, NEW YORK

SYNCHRONIZER DEVICE

Application filed April 25, 1928. Serial No. 272,850.

The invention relates to a synchronizing device for causing a pair of clutch elements forming a mechanical clutch to approach the same speed before they are moved into inter-driving relation and the present disclosure constitutes an improvement in the construction disclosed in my copending application entitled "Cam actuated clutch ring synchronizer", being Serial No. 50,279 filed August 14, 1925.

In the above identified application a ring form of synchronizing device is positioned between the two elements which coact to form a mechanical clutch of the telescopic type. The synchronizer is moved into frictional engagement with one of the clutch elements which is axially fixed by the reaction between itself and cams formed on the shaft upon which the shiftable clutch element is mounted when the freedom of rotary movement of the synchronizer is restrained by the engagement therewith of the shiftable clutch element. In the form of the invention disclosed in the preceding application much difficulty was experienced in forming the cam surfaces on the synchronizer especially when attempts were made to produce these synchronizers economically in commercial quantities. Further the construction tended to produce wear between the parts when the clutch elements were in their unclutched position.

The primary object of this invention is to improve certain details of construction in devices of this character and to effect economies in manufacturing costs, in minimizing of wearing parts and in the space necessary to accommodate the construction. Specifically, one of the important objects of the invention is to provide a form of cam actuated synchronizer which can be produced economically and accurately as a factory production and with conventional forms of cam forming machinery.

Still another object of the invention is to provide a form of synchronizer which will permit the use of a longer engagement between the shiftable clutch element and the spline portion of the shaft on which it is mounted than has been possible heretofore without increasing the all-over dimension of this element.

Still another object of the invention is to provide in a structure of the type outlined an organization of the parts arranged so as to eliminate as far as possible wear due to the accidental contacting of parts which are turning relative to each other after the clutch elements have been shifted into their inoperative, unclutched position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing,

Fig. 1 is a fragmentary view in axial cross section of parts of a pair of elements forming a mechanical clutch together with a ring type synchronizer illustrating a preferred embodiment of the invention;

Fig. 2 is a similar view corresponding to the upper half of the showing in Fig. 1, and illustrating a modified form of the invention; and Fig. 3 is a view in side elevation of the portion of the synchronizer which is provided with the camming surfaces herein featured, viewing the same from the right hand side of the showing thereof in Figs. 1 and 2.

In the drawings, there is shown a power shaft 10 being twice reduced to form successive cylindrical bearing portions 11 and 12. Mounted on the portion 12 is a gear 13 constituting an axially fixed element of a mechanical clutch and referred to hereinafter as the male clutch or jaw. The unreduced portion 14 of the shaft has splined thereto an internal gear 15 constituting a shiftable clutch element, referred to hereinafter as the female clutch element or jaw and into which telescopes the male element 13 as the element 15 is shifted from right to left of the position shown in Fig. 1 by the actuation of a shift fork common in such structures but not herein shown.

In the showing in Fig. 1 the inner end of the element 13 which intrudes into element 15 provides a friction face which may be formed of a removable insert 16. In this showing the synchronizer coacts with the axially fixed male clutch element 13 to form a friction clutch of the side face type.

The inner face of the element 13 is provided within the ring formed by the insert 16 with a centrally positioned annular recess 17 designed to receive a portion of the ring type form of synchronizer 18 positioned between the clutch elements for the purpose of causing them to approach the same speed before they are moved into their intermeshed or interclutched relation.

The synchronizer 18 is of a dish shape and is formed of an inner mounting ring 19 and an axially offset outer clutch ring 20 and a connecting frusto-conical web 21. The clutch ring projects outwardly of the recess 17 and overlaps the end of the clutch element in both of the forms illustrated in Figs. 1 and 2. The synchronizer has a slight freedom of movement axially on the bearing 11 to and from a side face clutching engagement with the end of the element 13 as shown in Fig. 1, or to and from a cone face clutching engagement with this element as shown in the disclosure in Fig. 2.

The outer portion of the sychronizer forming the clutch ring 20 is provided with a peripheral groove 21′ in which is mounted a split resistant spring 22. This spring is so proportioned that normally, when in expanded position, it projects radially out of the groove and beyond the peripheral outline of the synchronizer. When so positioned, the split ring is in the path of movement of the teeth forming the inner peripheral face of the female element 15.

The annular recess 17 in the case of the showing in Fig. 1 permits the formation of a relatively long bearing for the synchronizer in its engagement with the shaft portion 11 without increasing the spacing apart of the clutch elements when in unclutched position over the showing in the above indentified application. This long engagement of the synchronizer on the shaft not only provides for an extremely rugged form of mounting ring 19 but also in the case of the showing in Fig. 2 the outer periphery 24 of the frusto-conical web 21 coacts with the inclined surface 25 outlining the recess 17 to provide a friction clutch 26 of the cone type between the synchronizer and the axially fixed male clutch element 13 permits the installation of the resetting device 23 hereinafter described.

For the purpose of shifting the synchronizer axially into its frictional clutching engagement with the axially fixed element 13, camming means are provided between the shaft 10 and the synchronizer 18. For this purpose the adjacent ends of the splines 27 formed on the unreduced part of the shaft 10 are beveled in opposite rotary directions to provide inclined surfaces 28—29 designed to engage in recesses 30 formed in the end face of the ring 19 and which ring will be referred to hereinafter as a camming ring. The inner periphery of the web 21 outlines the outer side of an annular recess 31 formed in the side of the synchronizer which faces the element 15. This recess has a shape and size sufficiently large to permit the insertion therein of the machine tools which are used to form the inclined cam faces 32 defining the recesses 30. As the faces 32 are thus formed in the side face of a ring which has its inner and outer peripheral surface exposed, it is possible to form the cams on the synchronizer accurately and economically in commercial production as the machining tools are free to pass in a direction diametrically of the axis of the synchronizer to and from the annular recess 31.

It is an advantage in constructions of this character to provide the longest possible bearing and spline engagement between the shiftable clutch element 15 and the spline portion of the shaft on which it slides, but space limitations which limit the total length of the element 15 have heretofore prevented the making of the spline engagement as long as desired. In the instant case, due to the peculiar shape of the synchronizer with its axially offset rings 19 and 20, it has been possible to provide an extension 33 from the wall 34 which connects the toothed rim 35 of the element 15 with the shaft 10.

This extension 33 provides in effect a relatively long hub extending along the shaft and in this way there is provided a splined engagement with the shaft longer than has been possible heretofore. It is understood that when the clutch elements are in their fully telescoped, clutching engagement the outer face of the clutch ring 20 may be disposed close to the web 34 and this permits the extension 33 to enter the recess 31 and to be moved almost into endwise engagement with the cam ring 19. From this construction, it is appreciated that increased engagement is provided between the driving shaft 10 and the clutch element 15 without increasing the overall dimension considered lengthwise of the element 15.

It is a feature of this disclosure that the synchronizer turns with the shaft 10 even when the clutch elements 13 and 15 are in their unclutched position as shown in Figs. 1 and 2. This turning of the synchronizer with the shaft on which it is mounted is attained due to the fact that the ends 28 and 29 of the splines at all times engage in the recesses 30. While there is a slight freedom of relative rotary movement between the shaft 10 and the synchronizer in order to permit the slight axial shifting necessary to effect the frictional clutching engagement, the parts are so proportioned that the synchronizer cannot entirely escape from the camming end of the splines.

The resetting mechanism 23 is designed so that when the synchronizer is free of the retardant action imposed on the same by the engagement of the rim 35 with the spring 22, the synchronizer is moved away from its clutching engagement with the element 13. For this purpose the cylindrical bearing portion 11 of the shaft is provided with a plurality of radially extending recesses 36 fitted into the outer end of which are rollers 37 maintained in position projecting slightly from the recess by backing springs 38 contained in the recesses 36. The inner face of the relatively long mounting ring 19 encircling the circumferentially spaced rollers 37 is provided centrally thereof with a groove 39 which is arched in transverse section as illustrated in the drawing and in which the rollers 37 are free to revolve. It is understood that the tendency of the rollers 37 acting against the sides of the groove 39 when the synchronizer is shifted axially is to center the synchronizer as a whole and restore the same to the position shown in the drawings. In this position the frictional clutch surfaces are slightly spaced apart and the clutch inoperative. In this way the synchronizer is reset when idle and all moving parts move with the spline shaft.

I claim:

1. In a synchronizing device, the combination of a shaft having a reduced portion, the unreduced portion provided with splines terminating adjacent the reduced portion in cams, means providing a clutch with an axially fixed element positioned on the reduced portion of the shaft and a coacting shiftable element slidably mounted on the splined portion, said fixed element provided with a central recess, a combined clutch and camming ring constituting a synchronizer positioned between the elements of the clutch for causing the clutch elements to approach the same speed prior to being moved into clutching relation, said synchronizer including a bearing ring mounted for rotary movement on the shaft, partially contained in said central recess and provided on one side with recesses coacting with the cams formed at the ends of the splines to shift the synchronizer axially, said synchronizer including a clutch ring positioned exteriorally of the fixed element, offset axially from the bearing ring, lapping the adjacent end of the fixed element and adapted to be moved by the tendency of the cams and recesses to move past each other into frictional engagement therewith and a retardant spring carried by the clutch ring and adapted to be engaged by the shiftable element to cause the synchronizer to function.

2. In a synchronizer device, the combination of a shaft, a mechanical clutch including a male and a female element, one splined to the shaft and the other mounted for rotary movement about its axis and axially fixed relative thereto, said elements adapted to be moved into interdriving relation, a disk-shaped synchronizer between the elements for causing them to approach the same speed before they are moved into their interdriving relation, said synchronizer including a camming ring mounted on the shaft, a clutching ring encircling and spaced axially from said camming ring and at all times partially contained in the female element, said camming ring and shaft provided with means for shifting said synchronizer to cause the same to be moved axially into clutching engagement with one of the elements and said clutching ring provided with a retardant spring adapted to be engaged by one of said elements to change its movement relative to the shaft and thus cause the camming means to function.

3. In a device of the class described, the combination of a pair of clutch elements mounted for relative axial movement to and from a clutching position, a synchronizer positioned between the elements for causing them to approach the same speed prior to interengaging, said synchronizer having a slight freedom of movement axially relative to said elements, camming means for forcing the synchronizer axially and positively into its operative clutching engagement with one of the elements, all of the elements forming said camming means fashioned to be exposed for machining when separated from each other and resilient means acting on the synchronizer and tending to restore it automatically to its normal unclutched condition when free of the action of said camming means.

4. In a device of the class described, the combination of a pair of clutch elements mounted for relative axial movement to and from a clutching position, a ring form of synchronizer positioned between the elements for causing them to approach the same speed prior to interengaging said synchronizer provided on one side face with an annular groove, with the portion between the groove and the inner periphery of the synchronizer forming a mounting ring, means for causing the synchronizer to be moved into clutching engagement with one of the elements, said means including a cam on the end face of the mounting ring and said cam extending between the inner periphery of the synchronizer and said groove, and with the outer face of said cam exposed to said groove.

5. In a device of the class described, the combination of a shaft provided with synchronizer actuating cams, a pair of clutch elements mounted for rotary movement about the axis of said shaft, a ring shaped synchronizer mounted between the elements for causing them to approach the same speed before they are moved into clutching relation and mounted for rotary movement about said axis, said synchronizer provided on one of its side faces with an annular groove, the portion of the synchronizer between its inner periphery and said groove constituting a mounting ring having its exposed end fashioned to form cam surfaces adapted to coact with the cams on the shaft to cause a shifting of the synchronizer axially into clutching engagement with one of the elements.

6. In a device of the class described, the combination of a shaft, a pair of clutch elements mounted for relative axial movement, one of said elements provided with a toothed rim and a hub splined to the shaft, said rim and hub providing an annular space therebetween encircling the hub, a synchronizer positioned between the elements for causing them to approach the same speed, said synchronizer on the side facing the hub provided with a recess for receiving the hub and the outer portion of the synchronizer positioned in said annular space when the clutch elements are in their telescoped clutched relation.

7. In a synchronizing device, the combination of axially movable elements forming a mechanical clutch, each provided with recesses facing each other, a synchronizer therebetween for causing one of the elements to approach the speed of the other, said synchronizer including axially offset rings and a frusto-conical web connecting the rings, one of said rings contained in one of the recesses and the other ring projecting therefrom into the other recess when the clutch elements are in their juxtaposed but unclutched position.

8. In a synchronizer device, the combination of a clutch including a male and a female element, the end of the male element, which is adapted to intrude into the female element provided with an annular recess, a synchronizer between the elements for causing them to approach the same speed before moving into clutched relation, said synchronizer including a central part contained in said recess and provided on the opposite side with a recess facing the female element and said female element provided with an extension constituting a relatively long bearing adapted to be contained in the recess in the synchronizer when the elements are in clutched relation.

9. In a synchronizing device, the combination with a supporting shaft of means carried by the shaft forming a mechanical clutch, a synchronizing device carried by the shaft for causing the elements forming said clutch to approach the same speed before moving into clutching relation, said device movable into engagement with one of said elements to form a friction clutch therewith, and resilient means between the shaft and device and acting on said device for shifting the same along the shaft and into an unclutched position, said resilient means including a plurality of spring pressed rollers spaced apart circumferentially of the shaft and coacting to provide a roller bearing mounting for the synchronizing device to facilitate an easy shifting of said device axially on the shaft.

10. In a device of the class described, the combination of a shaft provided with splines, means forming a mechanical clutch and including an axially fixed element and a shiftable element splined to said shaft, a synchronizer for causing the elements of the mechanical clutch to approach the same speed before they are moved into clutching position, said synchronizer shiftable axially into engagement with the fixed element to form a friction clutch therewith, said synchronizer and shaft provided with camming means for shifting the synchronizer into its frictional clutching position and resilient means between the shaft and synchronizer tending to maintain said synchronizer in its unclutched position and with the camming means interengaging whereby the synchronizer will normally turn with the shaft said resilient means including a plurality of spring pressed rollers spaced apart circumferentially of the shaft and coacting to provide a roller bearing mounting for the synchronizing device to facilitate an easy shifting of said device axially on the shaft.

11. In a device of the class described, the combination of two members having relative rotary movement, each provided with an element coacting to provide a mechanical clutch, one of said members having a frusto-conical shaped recess in the side facing the other member, a synchronizer movable axially relative to both members and partly housed in said recess, said synchronizer provided with a frusto-conical external peripheral face adapted to coact with the frusto-conical wall outlining said recess to form a friction clutch of the cone type and camming means on the side of the synchronizer opposite said friction clutch for forcing the synchronizer axially into frictional engagement with said recessed member through said friction clutch.

Signed at New York in the county of New York and State of New York this 23rd day of April, A. D. 1928.

HOWARD J. MURRAY.